(12) United States Patent
Niitsuma

(10) Patent No.: US 6,876,520 B2
(45) Date of Patent: Apr. 5, 2005

(54) MAGNETIC DISK CARTRIDGE

(75) Inventor: Kazuhiro Niitsuma, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 49 days.

(21) Appl. No.: 10/315,176

(22) Filed: Dec. 10, 2002

(65) Prior Publication Data

US 2003/0112558 A1 Jun. 19, 2003

(30) Foreign Application Priority Data

Dec. 13, 2001 (JP) .................................. 2001-379522

(51) Int. Cl.[7] .......................... G11B 23/033; G11B 17/02
(52) U.S. Cl. ................... 360/133; 360/135; 360/99.04; 360/99.08
(58) Field of Search ........................... 360/133, 135, 360/99.04, 99.08

(56) References Cited

U.S. PATENT DOCUMENTS

| | | | | |
|---|---|---|---|---|
| 3,805,292 A | * | 4/1974 | Hashiguchi et al. | 360/135 |
| 4,779,160 A | * | 10/1988 | Oishi | 360/135 |
| 5,249,093 A | * | 9/1993 | Umekida et al. | 360/135 |

FOREIGN PATENT DOCUMENTS

JP  62-289982  12/1987

* cited by examiner

Primary Examiner—Robert S. Tupper
(74) Attorney, Agent, or Firm—Sughrue Mion, PLLC

(57) ABSTRACT

A magnetic disk cartridge comprising a housing with space, and a magnetic disk rotatably held in the space of the housing. The magnetic disk includes a flexible magnetic recording medium, and at least one rigid ring mounted on the circumferential edge portion of the magnetic recording medium.

15 Claims, 5 Drawing Sheets

MAGNETIC DISK CARTRIDGE

BACKGROUND OF THE INVENTION

1. Field of the Invention

The present invention relates to a small magnetic disk cartridge that can be exchangeably loaded in a card disk drive that can be loaded in the card slot of electronic equipment such as a digital still camera, a digital video camera, a laptop personal computer, etc.

2. Description of the Related Art

To record or reproduce information, a wide variety of recording media are removably loaded in the card slot of electronic equipment such as a digital still camera, a digital video camera, a laptop personal computer (PC), etc. Such recording media that are in practical use are a semiconductor memory type, a hard disk type, an optical disk type, a magnetic disk type (e.g., a floppy disk type), etc.

Among these recording media, the semiconductor memory type is most widely used, because it is easy to handle and has a large recording capacity. However, the semiconductor memory type is relatively expensive. Therefore, in digital cameras employing the semiconductor memory type, it is repeatedly used by storing the photographed image data in a PC, etc., and then deleting the data from the semiconductor memory.

Although there are known some hard disks that can store 340 megabytes (MB) of data or 1 gigabytes (GB) of data. However, the hard disk type memory medium is similarly expensive. Because of this, the hard disk type memory medium is repeatedly used by storing data in a PC, etc.

The optical disk type has a large recording capacity for its size. For example, an optical disk with a size of 35 mm×41 mm×11 mm can store 256 MB of data. Optical disks with a recording capacity of 512 MB are about to be realized. However, optical disks have the disadvantage that the recording speed is slow, because the writing time is time-consuming.

Small magnetic disks (e.g., floppy disks) with a size of about 50 mm×55 mm×2 mm are known that can be exchangeably loaded in a disk drive of a size that can be inserted in the card slot of a PC, etc. However, the recording capacity is as small as 40 MB and insufficient to store data photographed by a camera. In addition, the size is not suitable for digital cameras.

With the spread of PCs, digital cameras have spread rapidly in recent years because of the easy method of recording, enhancement of the picture quality due to the development of imaging devices, the possibility of data deletion and transmission, size of the recording capacity, etc. However, digital cameras are restricted in use, because recording media are restricted in cost and recording capacity, as described above. For instance, since recording media are very expensive, one camera is usually provided with one recording medium, which is repeatedly used. That is, when the recording medium is filled with data, the data is transferred to a PC and deleted from the recording medium. Because of this, there are cases where the recording medium is filled up during a trip. In addition, the recording medium cannot be stored as is, with data recorded therein, nor can it be given away to a person.

Hence, there is a demand for the realization of a small recording medium which is large in recording capacity and low in cost so that the data photographed by a digital camera can be stored as is, or given away to a person. In PCs, there is also a demand for the realization of an inexpensive small large-capacity recording medium that can be handed to a person.

To meet the aforementioned demands, it is contemplated that the above-described small recording medium may comprise a card disk drive which is loaded in electronic equipment such as a PC and a digital camera, and a magnetic disk cartridge which is loaded in the small card disk drive. That is, it is contemplated that such a magnetic disk cartridge may comprise a housing with a shutter, and a flexible magnetic disk, rotatably supported within the housing, which is capable of high-density recording and has a recording capacity of 200 MB or larger. Examples of magnetic recording media with a high recording density are a recording medium with a thin metal film formed by vapor deposition or sputtering, and a recording medium employing barium ferrite powder or ferromagnetic magnetic powder. An example of a magnetic recording medium with a high recording density employing barium ferrite powder is disclosed in U.S. application Ser. No. 10/266,584.

The "magnetic recording medium with a high recording density employing barium ferrite powder" is a magnetic disk containing barium ferrite powder in a magnetic layer, and is formed from a material that is capable of a high recording density. The magnetic disk may be constructed of a magnetic recording medium. The disclosed magnetic recording medium has a non-magnetic substrate, a non-magnetic layer which includes both non-magnetic powder and a binder, and a magnetic layer which includes both ferromagnetic powder (which is hexagonal-system ferrite powder) and a binder. The non-magnetic layer and the magnetic layer are formed on at least one surface of the non-magnetic substrate in the recited order. In the non-magnetic layer, the quantity of carbon black whose average particle diameter is 10 to 30 nm is 10 to 50 weight parts with respect to 100 weight parts of the aforementioned non-magnetic powder. The thickness of the magnetic layer is 0.2 $\mu$m or less. According to an electron-beam microanalysis, the standard deviation (b) of the strength of an element with respect to an average strength (a) which results from ferromagnetic powder is $0.03 \leq b/a \leq 0.4$. The center plane average roughness Ra of the magnetic layer is 5 nm or less, and the 10-point average roughness Rz is 40 nm or less. In a magnetic disk employing the above-described magnetic recording material, information is recorded or reproduced by employing a magnetic head, such as an MR head, which is capable of a high recording density.

The above-described magnetic recording medium can realize a high recording density of 200 MB or larger, preferably 500 MB or larger. Therefore, if a still image has about 1 MB of data per image, the magnetic recording medium can store 500 images. In the case of a motion picture, the magnetic recording medium can store image contents of about 30 minutes. Thus, the magnetic recording medium can store a motion picture photographed by a digital camera, or a motion picture transmitted by a portable telephone. As a result, users can conveniently use the magnetic recording medium. Furthermore, the magnetic recording medium can be conveniently used in PCs as an inexpensive large-capacity data storage medium. Thus, the convenience of the magnetic recording medium is great.

Note that card disk drives are loaded in electronic equipment such as a PC, a digital camera, etc. In the case of a PC shown in FIG. 6A, a card disk drive 6 is connected electrically with the socket 4 of the receiving portion of a card 2 that is inserted in the card slot of the PC. In the case of a digital camera 3 shown in FIG. 6B, a card disk drive 6 is connected electrically with the socket of the receiving portion 5 of the camera 3.

Therefore, the card disk drive 6 shown in FIG. 6A or 6B is extremely small in size and has, for example, a length of 38 to 55 mm, a width of 35 to 51 mm, and a thickness of 3 to 5 mm. A disk cartridge 8 that is loaded in the card disk drive 6 has, for example, a length and a width of 25 to 36 mm and a thickness of 1 to 3 mm.

To put the aforementioned magnetic recording medium to practical use, the recording capacity is required to be as large as possible, as previously described. The central portion of a conventional magnetic recording medium is mounted on a disk-mounting hub, which is spun by a spindle provided in a disk drive. Since a portion of the magnetic recording medium that is occupied by the hub cannot be used, an area that can be used for recording is narrowed by the amount corresponding to the hub. As the size of a magnetic recording medium becomes smaller, an area that cannot be used by the hub will have a greater effect on the recording capacity. Note that a magnetic disk is mounted on the hubby employing a hot melt, adhesive agent, etc. Therefore, in the case where a magnetic disk is small, great deformation occurs in the disk when the magnetic disk is mounted on the hub. Because of this, surface runout occurs during rotation of the disk, and consequently, there is a possibility that the magnetic disk cannot be used. Particularly, great deformation tends to occur in a portion of the recording surface near the hub. Thus, in the vicinity of the hub, a recording area that can be used is restricted.

SUMMARY OF THE INVENTION

The present invention has been made in view of the above-described circumstances. Accordingly, it is the primary object of the present invention to provide a magnetic disk cartridge that is large in recording capacity and capable of reducing the deformation of its flexible disk.

To achieve this end and in accordance with the present invention, there is provided a magnetic disk cartridge which comprises a housing with a space within its interior, and a magnetic disk rotatably held in the space of the housing. The magnetic disk comprises a flexible magnetic recording medium, and at least one rigid ring mounted on the circumferential edge portion of the magnetic recording medium.

That is, the flexible disk of the magnetic disk cartridge of the present invention is characterized in that a hub for rotating the disk is replaced with the above-described circumferential ring.

In the magnetic disk cartridge of the present invention, it is preferable that the housing includes an opening; a shutter which opens and closes to expose a recording surface of the magnetic disk through the opening; and support rollers for rotatably supporting the ring.

It is also preferable that the aforementioned ring is formed from metal.

The aforementioned support rollers may also comprise two rollers disposed at predetermined positions within the housing and one roller attached to the shutter.

Further in accordance with the present invention, there is provided a magnetic disk drive which comprises (1) a housing into which a magnetic recording medium with at least one ring mounted on a circumferential edge portion of the medium is inserted, (2) a magnetic head, disposed within the housing, for recording or reading information on or from the magnetic recording medium, and (3) a driving shaft, disposed within the housing, for rotating the magnetic recording medium while contacting the ring.

As set forth above, the magnetic disk of the magnetic disk cartridge of the present invention comprises a flexible discoid magnetic recording medium, and at least one rigid ring mounted on the circumferential edge portion of the magnetic recording medium. Therefore, the magnetic disk cartridge of the present invention has the following advantages:

(1) The flexible magnetic recording medium has no hub. Therefore, information can be recorded on a wide area up to the vicinity of the center of the recording medium. As a result, even if the magnetic disk cartridge is small in size, it can have a large recording capacity. (2) Since at least one ring with rigidity is mounted on the circumferential edge portion of the flexible disk, deformation is less liable to occur on the entire surface of the disk. As a result, head touch is enhanced during recording and reading, and stable recording-reproduction performance is obtained. (3) The flexible disk can be assembled by holding the ring without touching the recording surface of the disk. As a result, the handling performance is enhanced. In addition, there is little possibility that the recording surface will be contaminated. Furthermore, the reliability of the device performance can be assured.

BRIEF DESCRIPTION OF THE DRAWINGS

The present invention will be described in further detail with reference to the accompanying drawings wherein.

DESCRIPTION OF THE PREFERRED EMBODIMENT

Figure 1:
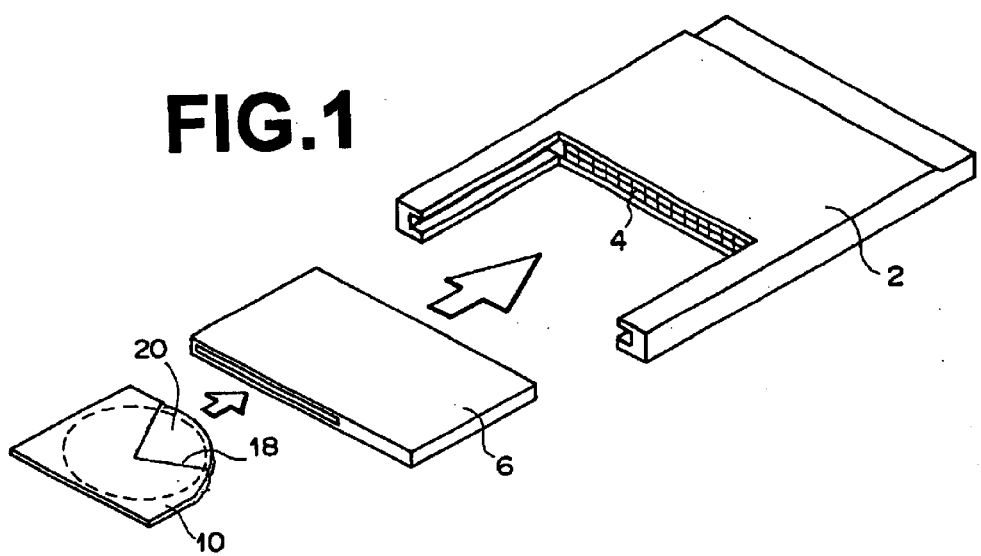
FIG. 1 is a perspective view showing a magnetic disk drive which is inserted in the card slot of a PC card, and a magnetic disk cartridge of a preferred embodiment of the present invention which is inserted in the magnetic disk drive.

Referring now to FIG. 1, there is shown a magnetic disk cartridge 10 constructed in accordance with a preferred embodiment of the present invention. The magnetic disk cartridge 10 is inserted in a magnetic disk drive 6, which is in turn connected electrically with the socket 4 of a card 2 that is inserted in the card slot of a PC. The magnetic disk cartridge 10 is substantially rectangular in shape. A corner of the magnetic disk cartridge 10, which becomes the front portion of the magnetic disk cartridge 10 when it is inserted into the magnetic disk drive 6, is formed into an arcuate shape. This arcuate portion is equipped with a V-shaped head opening 18, which is in turn covered with a shutter 20.

Figure 2A:
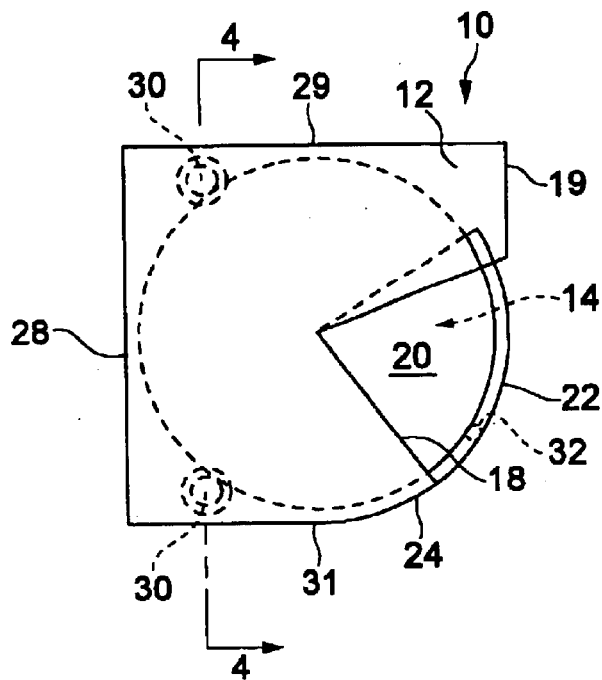
FIG. 2A is a plan view of the magnetic disk cartridge shown in FIG. 1, a shutter having been closed.
Figure 2B:
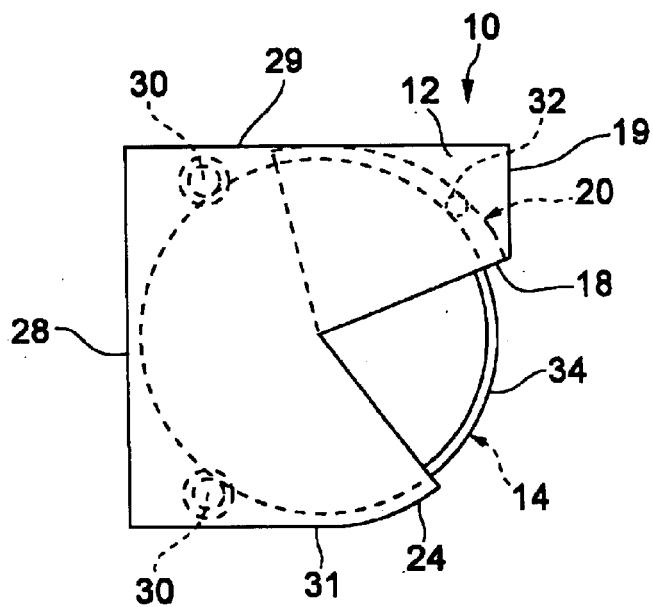
FIG. 2B is a plan view of the magnetic disk cartridge shown in FIG. 1, the shutter having been opened.

As illustrated in FIGS. 2A and 2B, the magnetic disk cartridge 10 has a flat housing 12 in which a flexible magnetic disk 14 is rotatably supported. The housing 12 has the above-described head opening 18 through which a magnetic head 16 (see FIG. 5) is positioned over the recording surface of the magnetic disk 14. The housing 12 also has the above-described rotatable fan-shaped shutter 20 that opens and closes to expose the recording surface of the magnetic disk 14 through the head opening 18.

The housing 12 is substantially rectangular in shape. At the front face 19 of the housing 12, the above-described head opening 18 for exposing the magnetic disk 14 is formed in each side of the housing 12. The front face 19 of the housing 12 refers to a face that is positioned on the front side when the magnetic disk cartridge 10 is inserted in the magnetic disk drive 6. A face that is positioned on the rear side is represented by a rear face 28. Faces that are positioned on the right and left sides are represented by a right side face 31 and a left side face 29, respectively. The fan-shaped shutter 20 has an arcuate exterior face 22 along the exterior shape of the magnetic disk 14 and is rotatable about a pivot at the substantial center of the housing 12. When the shutter 20 is opened, it is housed within the housing 12. On the other hand, when the shutter 20 is closed, the arcuate exterior face 22 of the shutter 20 is substantially continuous to a curved face 24 which is the front portion of the right side face 31 of the housing 12.

The magnetic disk 14 is rotatably disposed within the space 26 (FIG. 4) of the housing 12 and shutter 20. The detailed structure of the magnetic disk 14 will be described later. Within the space 26 of the housing 12, two support rollers 30 are spaced near and along the rear face 28 of the housing 12 opposite to the head opening 18. Likewise, the shutter 20 is equipped with an auxiliary roller (support roller) 32. With these support rollers 30 and 32, the magnetic disk 14 is rotatably held. As shown in FIG. 3, rigid metal rings 34 are mounted on both sides of the circumferential edge portion 38 of the magnetic disk 14. The support rollers 30 contact and support the rings 34.

When the shutter 20 opens and closes, the auxiliary roller 32 moves while contacting the rings 34. More specifically, when the shutter 20 is closed, the auxiliary roller 32 is within the head opening 18, as shown in FIG. 2A. If the shutter 20 opens, the auxiliary roller 32 moves into the space of the housing 12, as shown in FIG. 2B. The support rollers 30, 30, and 32 are positioned so that they can hold the magnetic disk 14 at all times.

Figure 3A:
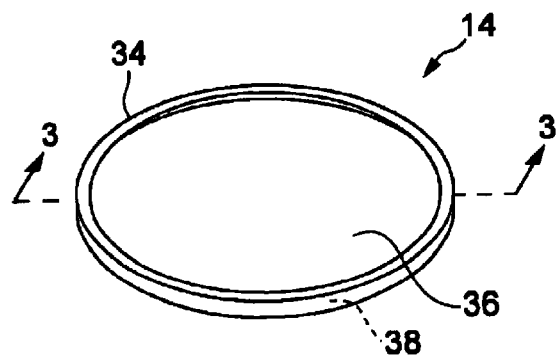
FIG. 3A is a perspective view of the magnetic disk used in the magnetic disk cartridge of FIG. 2.
Figure 3B:
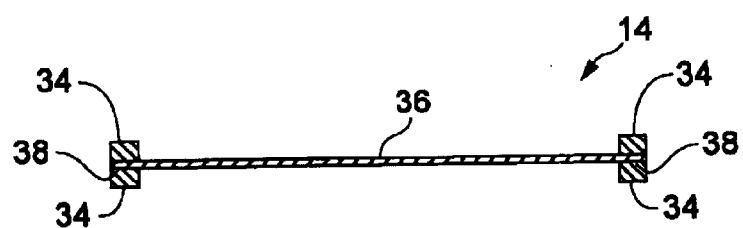
FIG. 3B is a sectional view of the magnetic disk taken substantially along line 3—3 of FIG. 3A.

Now, the magnetic disk 14 will be described in detail with reference to FIG. 3. FIG. 3A shows a perspective view of the magnetic disk 14 used in the magnetic disk cartridge 10 of FIG. 2, FIG. 3B shows a sectional view of the magnetic disk 14 taken along line 3B—3B of FIG. 3A, and FIG. 3C shows an enlarged sectional view of another magnetic disk 80.

As illustrated in FIG. 3A, the magnetic disk 14 is equipped with a pair of rigid metal rings 34 of the same shape, which are mounted on the circumferential edge portion of a magnetic recording medium 36 in the form of a disk. The rings 34 are mounted on both sides of the circumferential edge portion of the magnetic recording medium 36, as shown in FIG. 3B. The rings 34 are mounted on both sides of the medium 36 after the magnetic recording medium 36 is stretched outward over the entire circumference thereof. Therefore, the surface of the magnetic recording medium 36 has no deformation or wrinkles and can be made flat. In the present embodiment, while the two rings 34 are mounted on both sides of the magnetic recording medium 36, the present invention is also applicable to the case where one ring is mounted on one side.

The assembled magnetic recording medium 36 can be assembled into the magnetic disk 14 by holding the rings 34 without touching the magnetic recording medium 36. Because the magnetic recording medium 36 can be kept clean, there is little possibility that the reliability of the recording and reproduction of information will be reduced. It is preferable that the rings 34 be formed from metal having rigidity. However, the rings 34 are not limited to metal. They may be formed of a rigid resin. In addition, the rings 34 do not always need to be the same in shape. Furthermore, the magnetic disk 14 maybe formed by bonding a sheet with a hole to the magnetic recording medium 36 and then punching out the sheet into a ring shape.

Figure 3C:
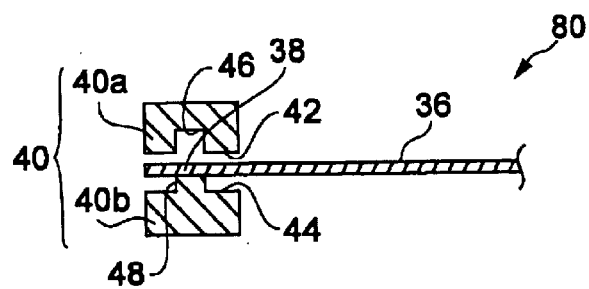
FIG. 3C is an enlarged sectional view of another magnetic disk that is used in the magnetic disk cartridge of FIG. 2.

Now, a description will be given in the case where a magnetic disk 80 has a ring 40 which comprises a pair of rings 40a and 40b different in shape, as shown in FIG. 3C. The bottom face of the upper ring 40a has an annular groove 46, while the top face of the lower ring 40b has an annular rib 48. The annular groove 46 and the annular rib 48 have dimensions so that they engage each other through the circumferential edge portion 38 of the magnetic recording medium 36 of the magnetic disk 80. That is, if the annular rib 48 is fitted into the annular groove 46 with the magnetic recording medium 36 stretched outward at the circumferential edge portion 38 of the magnetic recording medium 36, then the magnetic recording medium 36 can be held while it is being kept flat. The rings 40a and 40b may be connected together by an adhesive agent, etc. They may also be formed from metal, resin, etc. If the rings 40a and 40b are mounted on both sides of the circumferential edge portion 38 of the magnetic recording medium 36 by the combination of a groove and a rib, then there is no possibility that the magnetic recording medium 36 will be deformed due to heat, because they can be assembled at normal temperature.

The magnetic recording medium 36 employs a coat-type magnetic recording medium or a thin metal film type of magnetic recording medium. An example of the coat-type magnetic recording medium is commercially available high-density flexible disks. Examples of magnetic materials for the thin metal film type of magnetic recording medium are Co, alloys with Co (e.g., CoPtCr, CoCr, CoPtCrTa, CoPtCrNbTa, CoCrB, CoNi, etc.), Fe, and alloys with Fe (e.g., FeCo, FePt, FeCoNi, etc.).

Figure 4:
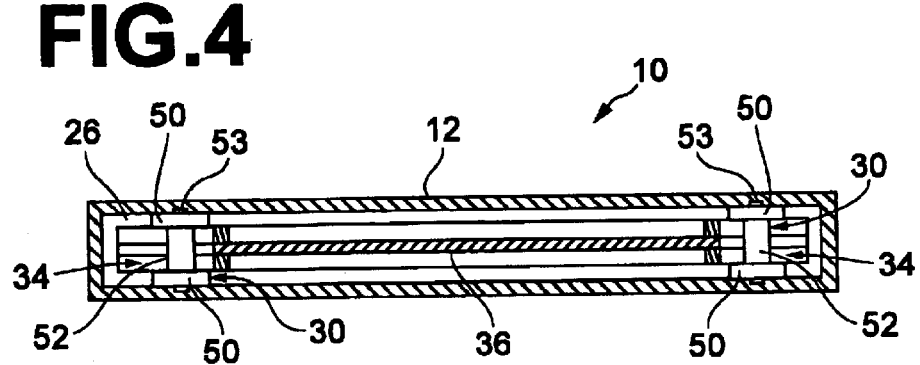
FIG. 4 is an enlarged sectional view of the magnetic disk cartridge taken substantially along line 4—4 of FIG. 2A.

Referring now to FIG. 4, the magnetic recording medium 36 is supported by the support rollers 30. FIG. 4 shows an enlarged sectional view of the magnetic disk cartridge 10 taken substantially along line 4—4 of FIG. 2A. Note in FIG. 4 that the support rollers 30 are not shown in section. In addition, the dimensions of each part in FIG. 4 are exaggerated to facilitate the understanding of the structure.

As shown in the figure, the support rollers 30 each have a lower circular flange portion 50, an intermediate cylindrical support portion 52, and an upper circular flange portion 50. The support rollers 30 are rotatably supported within the housing 12 by pins 53. The rings 34 of the magnetic recording medium 36 contact the support portions 52 of the support rollers 30 to support the magnetic recording medium 36. With the upper and lower flange portions 50, the magnetic recording medium 36 rotates while being held in a predetermined vertical position. Although not shown, the auxiliary roller 32 has a similar shape and is attached to the shutter 20 so that it is likewise rotatable.

Figure 5:
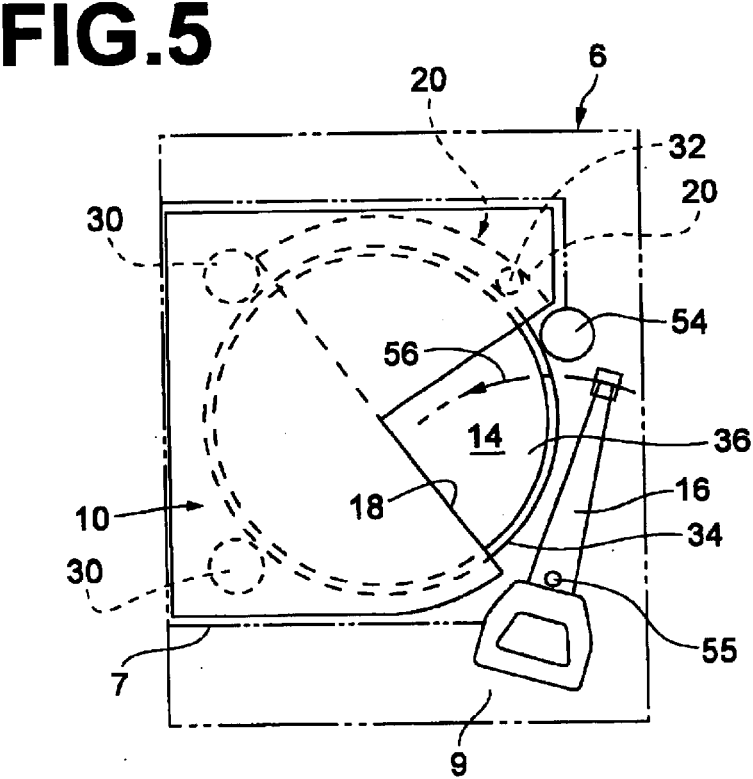
FIG. 5 is a plan view of the state in which the magnetic disk cartridge of FIG. 2 is inserted in a magnetic disk drive.
Figure 6A:
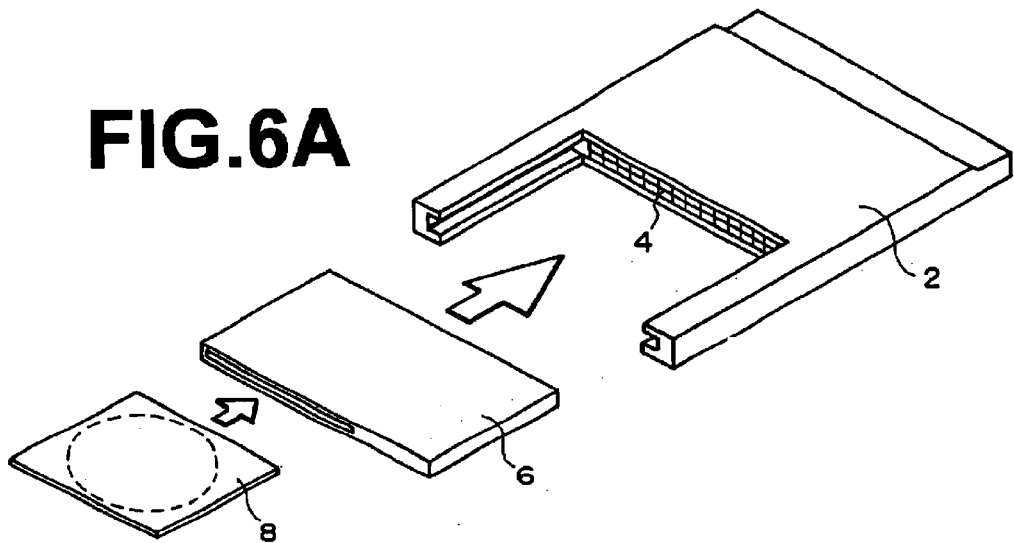
FIGS. 6A and 6B are diagrams used to explain how a magnetic disk cartridge is loaded in electronic equipment.
Figure 6B:
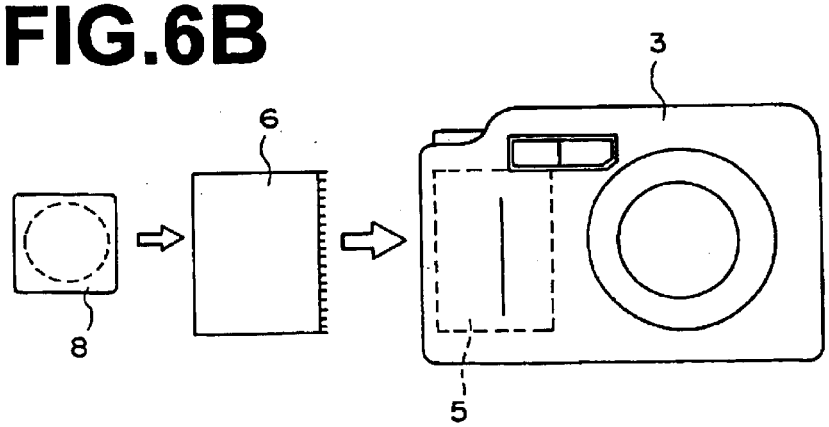

Referring now to FIG. 5, the magnetic disk cartridge 10 is inserted in a magnetic disk drive 6. FIG. 5 shows a plan view of the state in which the magnetic disk cartridge 10 is inserted in the magnetic disk drive 6. The shape of the magnetic disk drive 6 is represented by double broken lines. The housing 9 of the magnetic disk drive 6 has a slot 7 into which the magnetic disk cartridge 10 is inserted. The housing 9 is equipped with a magnetic head 16, and a driving shaft 54 by which the magnetic disk 14 is rotated. When magnetically recording or reproducing information, the magnetic head 16 is moved over the recording surface of the magnetic recording medium 36. For this purpose, the magnetic head 16 is rotatable on a fulcrum 55 so that it can move toward and away from the magnetic recording medium 36.

If, with the head opening 18 forward, the magnetic disk cartridge 10 is inserted into the slot 7 of the magnetic disk drive 6, the shutter 20 is opened by a drive unit (not shown) and the magnetic disk 14 is exposed through the head opening 18. Since the rings 34 of the magnetic disk 14 contact the driving shaft 54 of the magnetic disk drive 6, the magnetic disk 14 is rotated. Then, the magnetic head 16 is moved as indicated by an arrow 56 and positioned over a desired track on the magnetic recording medium 36. As the magnetic disk 14 has no hub, information can be recorded on or read from a track on the magnetic recording medium 36 over a wide area up to the vicinity of the center of the medium 36 with the magnetic head 16. Thus, the magnetic disk drive 6 is particularly suitable for the small magnetic disk cartridge 10. However, it is not limited to the small magnetic disk cartridge, but is applicable to magnetic disk cartridges of larger sizes. Thus, the magnetic disk drive 6 provides a high-density recording medium for electronic equipment in cooperation with the magnetic disk cartridge 10.

Although the driving shaft 54 and the magnetic head 16 are driven by a motor (not shown) provided within the magnetic disk drive 6, this motor may be provided outside the magnetic disk drive 6. In that case, only the driving shaft 54 may be disposed within the magnetic disk cartridge 10. It is preferable that the driving shaft 54 be in contact with the rings 34 and 40 through a material whose friction force is great, such as rubber, etc. In addition, the driving shaft 54 may be driven by the motor through a suitable gear interposed between the motor and the driving shaft 54.

While the present invention has been described with reference to the preferred embodiment thereof, the invention is not to be limited to the details given herein, but may be modified within the scope of the invention hereinafter claimed.

What is claimed is:

1. A magnetic disk cartridge comprising:
    a housing with space;
    a magnetic disk rotatably held in the space of said housing;
        wherein said magnetic disk comprises
            a flexible magnetic recording medium, and
            at least one rigid ring mounted on a circumferential edge portion of said magnetic recording medium; and
    support rollers for rotatably supporting said ring.

2. The magnetic disk cartridge as set forth in claim 1, wherein said housing is equipped with
    an opening, and
    a shutter which opens and closes to expose a recording surface of said magnetic disk through said opening.

3. The magnetic disk cartridge as set forth in claim 2, wherein said support rollers comprise two rollers disposed at predetermined positions within said housing and one roller attached to said shutter.

4. The magnetic disk cartridge as set forth in claim 1, wherein said ring is formed from metal.

5. The magnetic disk cartridge as set forth in claim 1, wherein said rollers support an outer portion of said ring.

6. A magnetic disk drive which comprises:
    a magnetic disk cartridge comprising a housing with a space into which a magnetic recording medium with at least one ring mounted on a circumferential edge portion of said medium is inserted;
    a magnetic head, disposed within said housing, for recording or reading information on or from said magnetic recording medium; and
    a driving shaft, disposed within said housing, for rotating said magnetic recording medium while contacting said ring;
    wherein said magnetic disk cartridge further comprises support rollers for rotatably supporting said ring.

7. The magnetic disk drive as set forth in claim 6, wherein said driving shaft contacts an outer portion of said ring.

8. The magnetic disk drive as set forth in claim 7, wherein said rollers of said magnetic disk cartridge support an outer portion of said ring.

9. The magnetic disk drive as set forth in claim 6, wherein said magnetic recording medium is a flexible magnetic recording medium.

10. The magnetic disk drive as set forth in claim 9, wherein said rollers of said magnetic disk cartridge support an outer portion of said ring.

11. The magnetic disk drive as set forth in claim 6, wherein said ring is mounted at only the circumferential edge portion of the magnetic recording medium.

12. The magnetic disk drive as set forth in claim 11, wherein said rollers of said magnetic disk cartridge support an outer portion of said ring.

13. A magnetic disk cartridge comprising:
    a housing with an interior space; and
    a magnetic disk rotatably held in said interior space of said housing;
    wherein said magnetic disk comprises:
        a flexible magnetic recording medium;
        at least one rigid ring mounted on an outer peripheral edge portion of said magnetic recording medium; and wherein
        a disk mounting hub is not provided at the center portion of said magnetic recording medium.

14. The magnetic disk cartridge as set forth in claim 13, further comprising support rollers for rotatably supporting said ring.

15. The magnetic disk cartridge as set forth in claim 14, wherein said rollers support an outer portion of said ring.

* * * * *